UNITED STATES PATENT OFFICE.

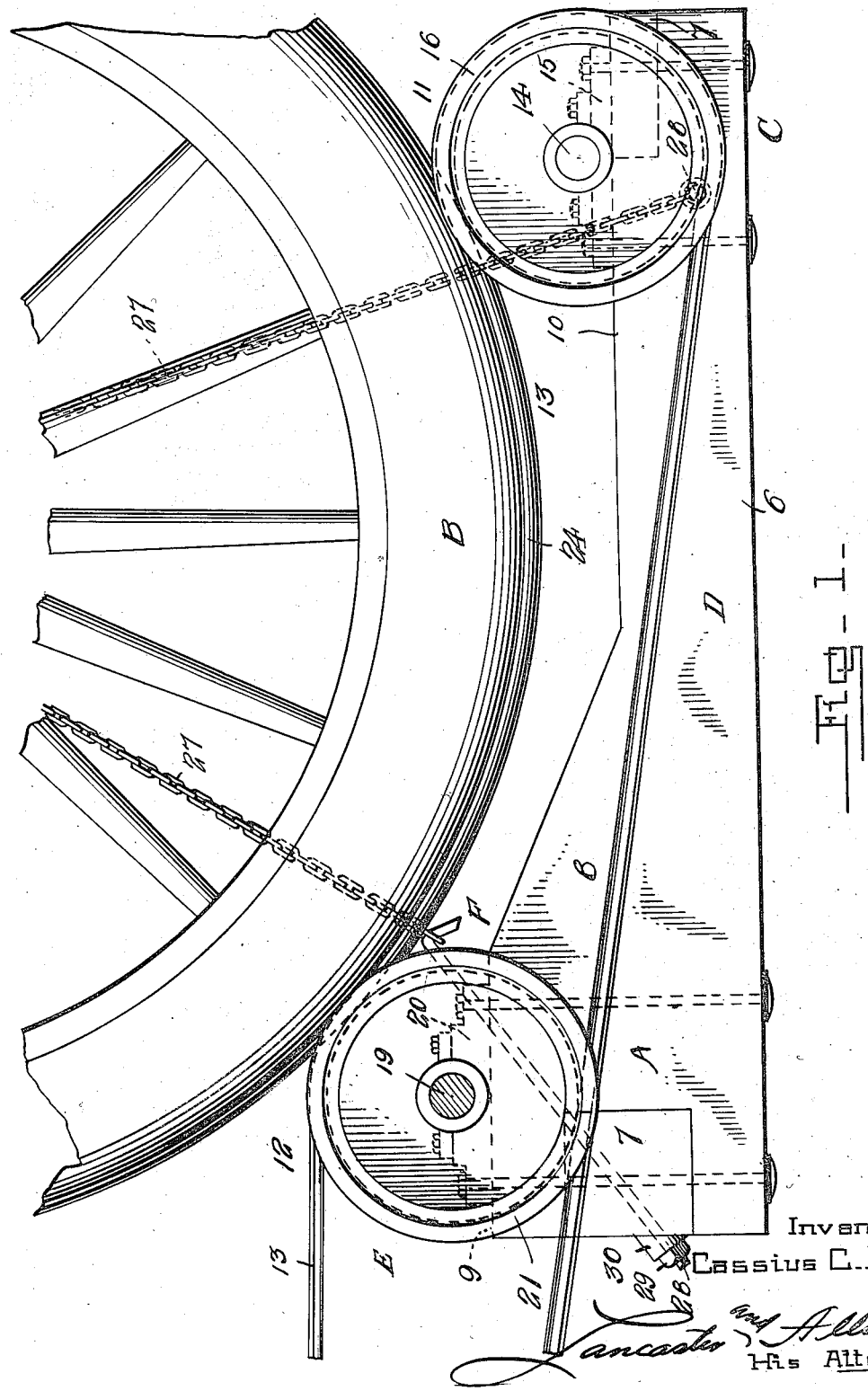

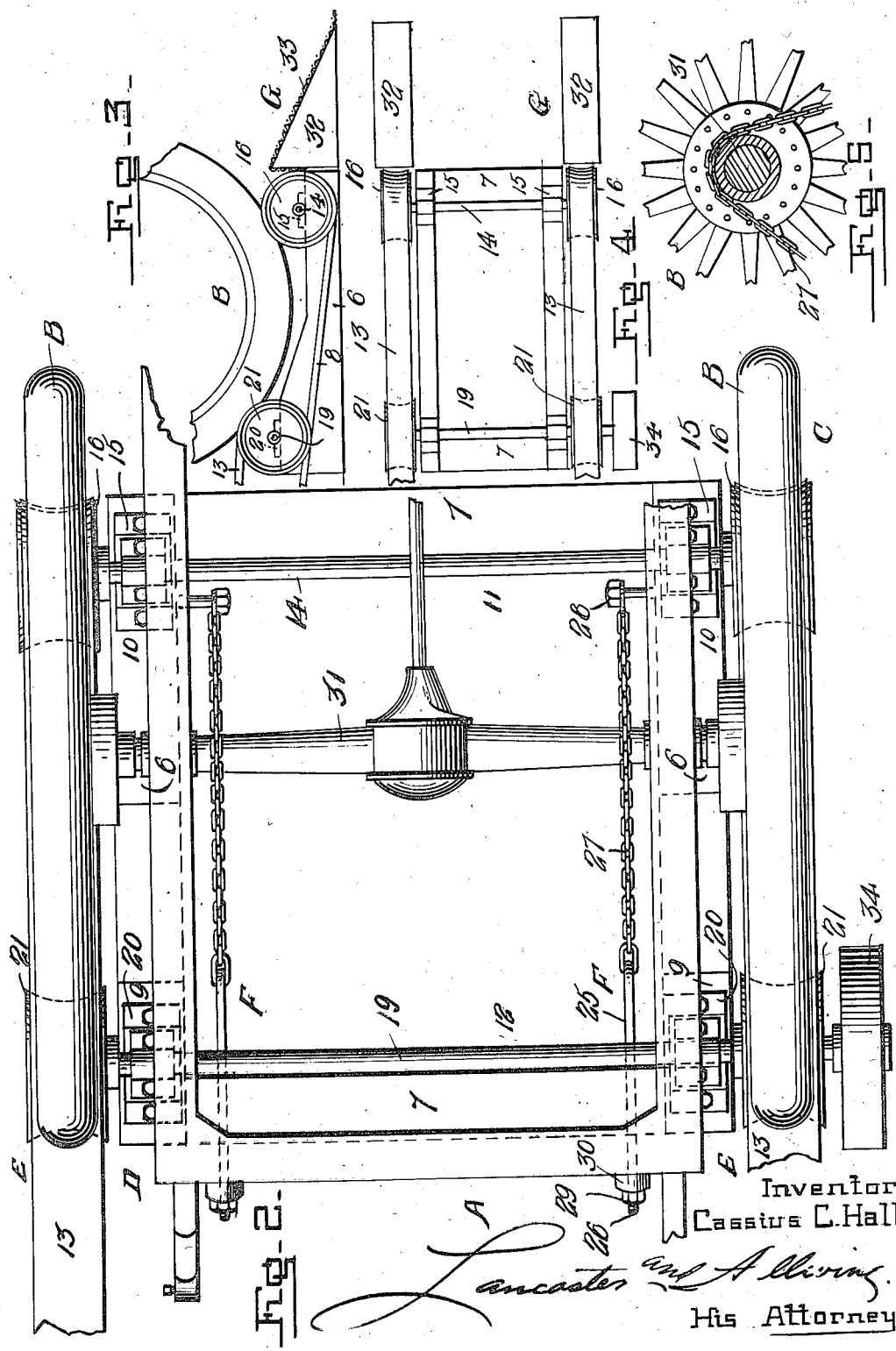

CASSIUS C. HALL, OF DANVILLE, ILLINOIS.

POWER TRANSMISSION.

1,279,105.

Specification of Letters Patent.  Patented Sept. 17, 1918.

Application filed August 9, 1916.  Serial No. 114,048.

*To all whom it may concern:*

Be it known that I, CASSIUS C. HALL, a citizen of the United States, and a resident of Danville, in the county of Vermilion and State of Illinois, have invented a certain new and useful Improvement in Power Transmission, of which the following is a specification.

My present invention relates to apparatus for utilizing the motive power of motor vehicles when the bodies are inert, for purposes other than propelling the vehicle, such as for running machinery, loading apparatus, or operating pumps.

The principal objects of my invention are to provide apparatus of the character described, which supports the power wheel of the vehicle and the load coming thereupon, in a manner to prevent movement of the vehicle body forwardly, rearwardly, and laterally to any material degree, maintaining the vehicle in operative relation to the power transmission; to provide power transmission which is so constructed as to facilitate the placing of the motor vehicles into operative relation thereto, as by backing the same upon the power transmission, which latter is so arranged as to resist such backing movement as soon as the power wheels of the vehicle are in operative relation to its parts; and, to provide novel means whereby the motor vehicle may be moved into or out of operative relation to the power transmission when the latter is raised from the ground, or disposed upon the ground, as when in a field, or on the ground adjacent buildings in the course of construction.

Further objects of my invention will appear in the following detailed description, taken in connection with the accompanying drawings, forming a part of this specification, and in which drawings:—

Figure 1 is a side elevation of power transmission embodying my invention and showing the power wheel of a motor vehicle in operative relation thereto.

Fig. 2 is a plan view of the transmission, a portion of the chassis of the running gear and the power wheels being shown in operative relation thereto.

Fig. 3 is a diagrammatic view in side elevation of the power transmission, power wheel, and means for facilitating placing of the motor vehicle into operative relation to the transmission.

Fig. 4 is a diagrammatic plan view of the power transmission, and the means referred to in connection with Fig. 3.

Fig. 5 is a detailed view partly in elevation and partly in vertical section through the rear axle of the motor vehicle.

In the drawings, where similar characters refer to similar parts throughout the several views, A designates the chassis of a motor vehicle including power wheels B; and, C power transmission constructed according to my invention, including a base D, movable supports E for the power wheels of the motor vehicle and adapted to be actuated thereby; F means for retaining the vehicle into operative relation to the transmission; and G devices to facilitate movement of the motor vehicle into or out of operative relation to the power transmission.

Referring first to the base D, it is preferably constructed of side members 6 and end members 7, secured together in any suitable manner, the side members 6 preferably enlarged, as at 8, at the rear of the transmission, with its upper face 9 of enlargement 8 in a horizontal plane considerably higher than the upper face 10 of the side member at the front of the transmission;—this for a purpose to be subsequently set forth.

Referring now to the movable supports E, they may include the two revoluble structures 11 and 12, and belts 13 trained about revoluble supports 11 and 12, the latter having horizontal axes of rotation which are in parallelism. It is preferred to construct the revoluble support 11 of a shaft 14 received by bearings 15 mounted on the top faces 10 of the side members 6; and wheels 16 in spaced relation, rigid with shaft 14. The revoluble structure 12 is likewise composed of a shaft 19, received by bearings 20, mounted upon the faces 9 of side members 6; and, two wheels 21 in spaced relation, made rigid with shaft 19.

In order to prevent lateral movement of the vehicle body, to any material extent, when the vehicle is in operative relation to the transmission, it is preferred to form the wheels 16 and 21 with their circumferences concave in cross section, under which conditions the belts 13 are concavo-convex in cross section throughout their length. With reference to Fig. 2, it will be observed that the wheels 16 and 21 are arranged in pairs, the wheels of each pair disposed in substantially the same vertical plane, one pair being adjacent each side member 6 of the base D.

By mounting the shafts 14 and 19 so that the latter is revoluble with its axis in a horizontal plane higher than the plane of the axis of shaft 14, the upper run 24 of each belt 13 is so arranged that its end portion at wheel 16 is lower than its end portion at wheel 21, so that, as the motor vehicle is backed into operative relation to the transmission, those portions of the belts 13 adjacent the wheels 21 will resist the backing movement, facilitating the placing of the motor vehicle into operative relation to the transmission.

As to the means F, it is preferably duplicated at each side of the transmission, and comprises a hook 25 including a screw-threaded stem 26 extending through the frame member 7 at the rear of the transmission; a flexible member 27, such as a chain, in engagement with the hook 25 and adapted for engagement with the chassis A of the motor vehicle, the opposite end of the flexible member being secured to the frame D as by bolt 28; and, a nut 29 turned tight upon screw-threaded stem 26 and adapted to abut against a metallic abutment 30 in engagement with the outer face of the end member 7, as clearly shown in Figs. 1 and 2 of the drawings. The flexible member 27 may be disposed in operative relation to the chassis of the motor vehicles by backing the latter upon the belts 13 and placing the hook 25 in a link of the chain, with the chain trained over the axle casing 31 of the motor vehicle, the nut 29 being released sufficiently so that the hook 25 may be moved longitudinally of the runs of belts 13 to accomplish this. The nut 29 is afterward placed and turned so as to draw the flexible member 27 taut. It is to be observed that the means F effectively holds the motor vehicle against movement from the power transmission at the lowermost ends of the runs 24 of belts 13.

The transmission may be disposed in a pit, (not shown in the drawings), so that the forward ends of the belts 13 are in substantially the same plane as the surface over which the motor vehicle is moved into operative relation to the transmission, under some conditions, however, such as when bringing the power transmission into use in a field or on the ground about a building in the course of construction, it is impractical to construct a pit for the transmission, and it is therefore desirable to mount the base D on the top surface of the ground. As approved means for enabling the user to move the motor vehicle into operative relation to the transmission under such conditions, I provide two wedge-shaped bodies 32, each body provided with a flexible strip 33, such as leather or canvas, carried by the bodies adjacent their apices. Prior to moving the motor vehicle into operative relation to the transmission, these bodies 32 are arranged adjacent the transmission, at the lower-most ends of the runs 24 of belts 13, with the flexible members 33 over the inclined faces. The motor vehicle may then be brought into operative relation to the transmission, the power wheels B riding up the inclined faces of the bodies, over the flexible strips 33. The backing movement will be resisted, as hereinbefore set forth, as the power wheels reach those portions of the runs 24 adjacent wheels 21. When it is desired to remove the motor vehicle from operative relation to the transmission, assuming that the devices F have been removed out of operative relation to the chassis A of the motor vehicle and the power wheels revolve in the direction indicated by the arrow in Fig. 1, the flexible strips 33 are fed intermediate the power wheels and the top faces of the runs 24 of belts 13, whereupon the power wheels of the motor vehicle will cease to actuate the belts 13, but ride upon the flexible members 33, out of operative relation to the transmission by moving down the inclined plane of the bodies 32.

If desired, either shaft 14 or 19 may be provided with a pulley 34 to facilitate operation of machines, and the portions of belts 13 tangent to wheels 21 and opposite to wheels 16 may be trained about the drive wheels of machines, or these belts may be merely passed about wheels 16 and 21, all power being taken through the intermediacy of shaft 14 or 19, or both shafts.

Changes in details may be made without departing from the spirit or scope of my invention; but,

I claim:—

1. In power transmission, the combination of a base, spaced-apart revoluble members carried by said base, belts carried by said revoluble members adapted to engage the treads of the driving wheels of a motor vehicle, said belts arranged with their upper ends each lower at one end portion of the transmission than at the other portion thereof, a hook movable diagonally to and in a plane longitudinally of said runs of said belts carried by said base, flexible means in engagement with said hook and adapted for engagement with the chassis of a motor vehicle, and means for drawing said hook in a general direction toward the end of the transmission where the belts are higher and to retain the hook in adjusted position.

2. In power transmission, the combination of a base, a movable support carried thereby, said support adapted to sustain the power wheels of a motor vehicle and the load coming thereupon, a hook movable diagonally to and in a plane longitudinally of the tread surfaces of said movable support, flexible means in engagement with said hook and adapted for engagement with the chassis of a motor vehicle, and means for retaining said hook in a set adjusted position, with respect to said base.

3. In power transmission, the combination of a base, two parallel belts disposed to engage the treads of the power wheels of a motor vehicle at their upper runs, said belts carried by said base, in an elevated position, two wedge-shaped bodies adapted to be disposed in alinement with said belts to facilitate movement of a motor vehicle into operative relation to said belts, and flexible members carried by said wedge-shaped bodies adapted to be placed intermediate the power wheels of the motor vehicle and said belts, to facilitate removal of the motor vehicle from operative relation to said power transmission.

4. As an article of manufacture, a vehicle wheel placer comprising in combination, a wedge-shaped body, and a flexible strip secured to said body near its apex and adapted to extend over the inclined face of the body to raise a power wheel and to extend from the apex of the body for directing a wheel to be lowered to the body.

5. In power transmission, the combination of two sets of wheels mounted to revolve about horizontal axes, the wheels of each set alined in the same vertical plane but in spaced relation, the circumference of said wheels concave transversely, and a belt for each set of wheels, said belts being retained concavo-convex in cross section throughout their lengths to retain power wheels from lateral displacement when arranged on the belts between the wheels of the transmission.

6. In power transmission, the combination of a base, a movable support carried thereby, said support adapted to sustain the power wheels of a motor vehicle and the load coming thereupon, a body providing an inclined plane to said movable support, and a flexible strip immovable at one end with respect to said base, and adapted to be disposed with its free end either trained beneath a power wheel of the motor vehicle or to overlie said inclined plane.

CASSIUS C. HALL.